United States Patent
Le Chevalier et al.

(10) Patent No.: US 10,049,416 B2
(45) Date of Patent: Aug. 14, 2018

(54) JOB RECALL SERVICES IN ONLINE EDUCATION PLATFORMS

(71) Applicant: Chegg, Inc., Santa Clara, CA (US)

(72) Inventors: Vincent Le Chevalier, Santa Clara, CA (US); Paul Chris Sri, San Jose, CA (US); Benjamin James Bercovitz, Mountain View, CA (US); Anand Madhavan, Santa Clara, CA (US); Charles F. Geiger, San Jose, CA (US)

(73) Assignee: Chegg, Inc., Santa Clara, CA (US)

( * ) Notice: Subject to any disclaimer, the term of this patent is extended or adjusted under 35 U.S.C. 154(b) by 748 days.

(21) Appl. No.: 14/091,234

(22) Filed: Nov. 26, 2013

(65) Prior Publication Data

US 2015/0149378 A1    May 28, 2015

(51) Int. Cl.
   *G06Q 50/20*   (2012.01)
   *G06Q 10/00*   (2012.01)

(52) U.S. Cl.
   CPC ............ *G06Q 50/20* (2013.01); *G06Q 10/00* (2013.01)

(58) Field of Classification Search
   CPC .................. G06Q 50/205; G06Q 50/2053
   USPC ............................................... 705/326
   See application file for complete search history.

(56) References Cited

U.S. PATENT DOCUMENTS

| | | | |
|---|---|---|---|
| 5,873,730 A | 2/1999 | Strong | |
| 5,879,165 A * | 3/1999 | Brunkow | G09B 7/04 434/322 |
| 6,126,448 A * | 10/2000 | Ho | G09B 7/04 434/118 |
| 6,944,596 B1 * | 9/2005 | Gray | G06Q 10/1053 434/107 |
| 6,978,115 B2 | 12/2005 | Whitehurst et al. | |
| 6,996,366 B2 * | 2/2006 | L'Allier | G09B 7/02 434/118 |
| 7,260,480 B1 | 8/2007 | Brown et al. | |
| 9,378,647 B2 | 6/2016 | Bercovitz et al. | |
| 2004/0219493 A1 | 11/2004 | Phillips | |
| 2005/0170321 A1 | 8/2005 | Scully | |
| 2006/0229902 A1 | 10/2006 | McGovern et al. | |
| 2007/0224580 A1 | 9/2007 | McFaul | |
| 2008/0102427 A1 | 5/2008 | Nissle | |

(Continued)

OTHER PUBLICATIONS

LaBay, Duncan G; Comm, Clare L. The International Journal of Educational Management; Bradford vol. 17, Iss. 6/7, (2003): 312-317. (Year: 2003).*

(Continued)

*Primary Examiner* — Andrew B Whitaker
(74) *Attorney, Agent, or Firm* — Kavita Aggarwal

(57) ABSTRACT

An online education platform manages and integrates a number of education services for users of the platform, including job recall services. These job recall services include management and distribution of job recall materials that test whether job applicants have acquired desired knowledge or skills for a particular job opening or class of jobs. The job recall materials are uploaded to the education platform and mapped to one or more learning units. Each learning unit is associated with an educational course and includes a distinct concept in the associated course. Responsive to a user of the education platform completing the learning unit to which a job recall material is mapped, the job recall material is recommended to the user.

20 Claims, 11 Drawing Sheets

(56) References Cited

U.S. PATENT DOCUMENTS

| | | |
|---|---|---|
| 2008/0147630 A1 | 6/2008 | Chu |
| 2008/0227063 A1 | 9/2008 | Kenedy et al. |
| 2008/0288431 A1 | 11/2008 | Colson et al. |
| 2009/0123902 A1 | 5/2009 | Higgs et al. |
| 2009/0144158 A1 | 6/2009 | Matzelle et al. |
| 2009/0228323 A1 | 9/2009 | Ebrahimian |
| 2010/0004944 A1* | 1/2010 | Palaniappan .......... G06Q 10/10 705/1.1 |
| 2010/0179916 A1 | 7/2010 | Johns et al. |
| 2011/0188761 A1 | 8/2011 | Boutros et al. |
| 2012/0028230 A1 | 2/2012 | Devereux |
| 2013/0096892 A1 | 4/2013 | Essa et al. |
| 2013/0164720 A1 | 6/2013 | Siimes et al. |
| 2014/0067703 A1 | 3/2014 | Baeck et al. |
| 2014/0074740 A1* | 3/2014 | Phillips ................ G06Q 50/205 705/328 |
| 2014/0186817 A1* | 7/2014 | Wang ...................... G09B 7/00 434/362 |

OTHER PUBLICATIONS

U.S. Appl. No. 13/540,432, filed Jul. 2, 2012, Copy not enclosed/Not yet published.

U.S. Appl. No. 13/540,432, filed Jul. 2, 2012, 66 Pages, (Not Yet Published, Copy Not Enclosed).

Wilson, D., "PDF Text Extraction in Java", bfo.com, Nov. 16, 2011, 2 pages, can be retrieved at <URL:http://bfo.com/blog/2011/11/16/pdf_text_extraction_in_java/>.

\* cited by examiner

JOB RECALL SERVICES IN ONLINE EDUCATION PLATFORMS

BACKGROUND

Field of the Invention

This invention relates to testing materials associated with job listings on an online education platform.

Description of the Related Art

The rising demand for high-skilled resources in a global economy is putting growing pressure on traditional education systems and environments. As too many students find themselves unable to effectively compete on today's job market, the need for education platforms to produce better tailored learning solutions is compelled with rising tuition costs amid challenging economies.

The resulting skills gap between actual degrees and jobs remains challenging to address because education, contrary to other domains, has typically been slow to adapt to new digital technologies both in term of infrastructure, curriculum, and publishing platforms. Typically, the structure of a course, with the required textbook as its central point of reference, has stayed remarkably monolithic and static over time, regardless of content or delivery formats, contributing to the current mismatch between the academic and professional workplace.

As traditional courses are shifting from a static textbook-centric model to a connected one where related, personalized and other social-based content activities are being aggregated dynamically within the core academic material, it becomes strategic for education publishing platforms and their distribution systems to be able to translate these activities into new models of learning that can bridge the growing gap between what business needs and what education delivers.

SUMMARY

An online education platform manages and integrates a number of education services for users of the platform, including distributing educational documents, maintaining logs of educational user activities, and capturing information about educational courses. The education platform deconstructs courses into learning units by analyzing user activities and documents associated with the courses. Each learning unit represents a distinct concept in the course and user activities associated with the concept.

The education platform also provides services to help job seekers find and apply for jobs and help job recruiters find and evaluate applicants' qualifications. These services include job recall services relating to creation and distribution of job recall materials and analysis of job recall activities. A job recall material is a document distributed by the education platform that tests whether job applicants have desired knowledge or skills relevant for a particular job opening or class of jobs. For example, an examination with a set of questions relating to desired knowledge for a job opening is a job recall material. When a user of the education platform interacts with a job recall material, the education platform captures a set of data describing the user's interactions. This data set is referred to herein as a "job recall activity," and corresponds to a user interaction with one of the job recall materials distributed by the education platform. In one embodiment, the job recall materials are uploaded to the education platform by recruiters. The uploaded job recall materials are analyzed to extract a one or more concepts tested by each material. The education platform maps job recall materials to respective learning units. In one embodiment, the mapping is based on a match between the concept extracted from a job recall material and the concept of a learning unit.

When a user of the education platform completes the learning unit to which a job recall material is mapped, the platform may recommend the job recall material to the user. In one embodiment, job recall materials are recommended to the user during the learning unit to which the material is mapped. In other embodiments, job recall materials are recommended after a user has completed the associated learning unit, such as at the end of the course or unit of study including the learning unit. Additionally or alternatively, the education platform may identify jobs available to the user based on learning units associated with the jobs and learning units completed by the user. A recall gap is determined between job recall materials associated with available jobs of interest to the user and the job recall activities completed by the user. If the user has not completed job recall activities corresponding to one or more of the recall materials associated with the available jobs, the education platform recommends the uncompleted job recall activities to the user.

The features and advantages described in this summary and the following detailed description are not all-inclusive. Many additional features and advantages will be apparent to one of ordinary skill in the art in view of the drawings, specification, and claims.

Figure 1A:
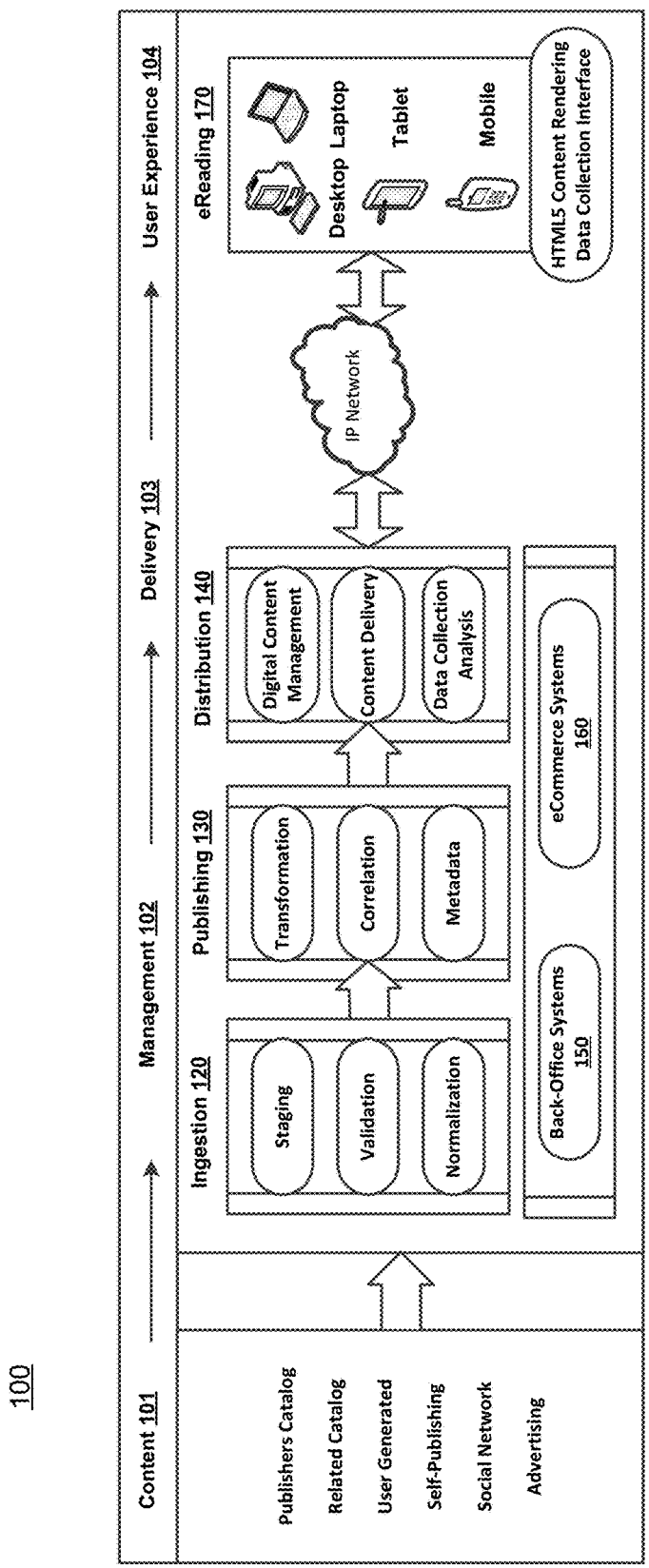
FIG. 1A illustrates an example publishing platform, according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Embodiments will be described herein in the context of a versatile education social learning platform for digital content interactive services distribution and consumption. In the platform, personalized education services are paired with secured distribution and analytics systems for reporting on both connected user activities and effectiveness of deployed services.

The education platform manages distribution and analysis of electronic educational documents, such as textbooks, trade books, study guides, user-generated notes, and electronic assignments and examinations. Individual pages of the educational documents are distributed to end users through authenticated reading sessions that capture user activities within each session. The education platform aggregates information about delivered pages of content and user activities during the reading sessions and constructs user activity logs for each user. The user activity logs provide information about the documents distributed by the educational platform and the learning activities of users using the platform.

The education platform maintains information about educational courses using information derived from the activity logs and/or information provided by users. As used herein, an educational course is a logical representation of subject matter and concepts. Courses are taught in one or more iterations, where each iteration is defined by a unique set of educational cycle (e.g., in which semester the course is taught), instructor teaching the course, and institution at which the course is taught. An example course is "Introduction to Thermodynamics," while example iterations of the course are "Introduction to Thermodynamics" taught at University A during the Fall 2013 semester, "Introduction to Thermodynamics" taught at University B during the Spring 2014 semester, and an online "Introduction to Thermodynamics" course made available during the Fall 2013 semester. The educational platform categorizes courses using a hierarchy of subject matter. For example, a subject of a course defines a high-level category of the course (e.g., "mathematics" or "American history"). A sub-subject of a course specifies a narrower category within the course's subject (e.g., "linear algebra" or "the American Revolution"). Further subcategorizations of course subject matter are also possible. Finally, the subject matter of a course is constructed from a set of concepts. For example, a course categorized as addressing linear algebra subject matter includes the concepts "linear independence" and "vector spaces."

Instructors may provide information about iterations of courses the instructors are teaching during a given educational cycle, including title of the class, subject matter of the class, textbook or other documents used in the class, and any institutional affiliation. Instructors may also provide a more detailed syllabus outlining concepts taught in the class and activities to be completed by the students registered for the class. Students may provide the education platform with information about courses the students are registered to take in each education cycle. In one embodiment, the education platform derives course information from user activities on the education platform. For example, the education platform determines which users are registered for a particular educational course based on textbooks purchased and accessed by the users. As another example, the education platform determines a schedule for a course based on times that users associated with the course complete various activities.

By analyzing activities that users are engaging in while accessing integrated educational services, the educational platform deconstructs courses into individual concepts and pairs these concepts to activities of users associated with each concept. By deconstructing the courses, the educational platform atomizes courses into individual "learning units," where each learning unit represents a concept of a course and associated user activities. As a result, a model of learning is developed in which learning units can be completed independently, as part of a predefined course, or aggregated as desired.

In addition to maintaining information about educational courses, the education platform provides services to help job seekers find and apply for jobs and help job recruiters find and evaluate qualified applicants. In one embodiment, the education platform maintains a database of job listings each corresponding to a job opening in a particular organization. The job listings may be associated with classes of jobs. For example, a job listing for an entry-level software engineer at Acme Software, Inc. corresponds to a particular job opening in a particular organization, but is associated with a general class of entry-level software engineering jobs. Other job listings associated with the same class may include listings corresponding to entry-level software engineering job openings at the same company or at other organizations.

As one particular service associated with matching job seekers to available jobs, the education platform provides job recall services. These job recall services include the distribution of job recall materials, which test whether job applicants have acquired desired knowledge or skills. In one embodiment, each job recall material is associated with at least one job listing or class of jobs, and a single job listing may be associated with multiple job recall materials. The job recall materials may be created by recruiters to test applicants for a particular job against desired qualifications for the job. When a user of the education platform interacts with a job recall material, the platform captures a job recall activity, where the job recall activity is a data set describing the user's interactions with the job recall material. Users of the education platform seeking to apply for the job complete the job recall activities as part of applying for the job. Other job recall materials may test whether applicants for jobs within a certain class of jobs have acquired desired skills or knowledge, as defined by a recruiter, an organization, or an industry standard. In this case, the job recall activities completed by users can be used to filter applicants for jobs within the class to inform recruiters about potentially qualified applicants and to inform applicants about potential career opportunities.

The concepts that job applicants need to have learned to be successful applicants for a job can be expressed as an aggregation of learning units. Whereas course recall materials are typically defined by an instructor of a course as a tool for assessing and quantifying students' understanding of the concepts taught in the course, a job recall material is defined by a recruiter as a tool for ascertaining whether job candidates have acquired desired skill or knowledge for a job or class of jobs. Job recall materials are mapped to the learning units. As a user completes learning units, the job recall materials mapped to the learning units can be recommended to the user. Moreover, by comparing learning units mapped to required job recall materials for a job to the learning units completed by a user, personalized learning unit and job recall gaps can be identified. The online education platform can then recommend how the user can fill the gaps through interactions with the education platform.

Online Education Platform

FIG. 1A is a high-level block diagram illustrating the education platform environment 100. The education platform environment 100 is organized around four function blocks: content 101, management 102, delivery 103, and experience 104.

Content block 101 automatically gathers and aggregates content from a large number of sources, categories, and partners. Whether the content is curated, perishable, on-line, or personal, these systems define the interfaces and processes to automatically collect various content sources into a formalized staging environment.

Management block 102 comprises five blocks with respective submodules: ingestion 120, publishing 130, distribution 140, back office system 150, and eCommerce system 160. The ingestion module 120, including staging, validation, and normalization subsystems, ingests published documents that may be in a variety of different formats, such as PDF, ePUB2, ePUB3, SVG, XML, or HTML. The ingested document may be a book, such as a textbook, a set of self-published notes, or any other published document, and may be subdivided in any manner. For example, the document may have a plurality of pages organized into chapters, which could be further divided into one or more sub-chapters. Each page may have text, images, tables, graphs, or other items distributed across the page.

After ingestion, the documents are passed to the publishing system 130, which in one embodiment includes transformation, correlation, and metadata subsystems. If the document ingested by the ingestion module 120 is not in a markup language format, the publishing system 130 automatically identifies, extracts, and indexes all the key elements and composition of the document to reconstruct it into a modern, flexible, and interactive HTML5 format. The ingested documents are converted into markup language documents well-suited for distribution across various computing devices. In one embodiment, the publishing system 130 reconstructs published documents so as to accommodate dynamic add-ons, such as user-generated and related content, while maintaining page fidelity to the original document. The transformed content preserves the original page structure including pagination, number of columns and arrangement of paragraphs, placement and appearance of graphics, titles and captions, and fonts used, regardless of the original format of the source content and complexity of the layout of the original document.

The page structure information is assembled into a document-specific table of contents describing locations of chapter headings and sub-chapter headings within the reconstructed document, as well as locations of content within each heading. During reconstruction, document metadata describing a product description, pricing, and terms (e.g., whether the content is for sale, rent, or subscription, or whether it is accessible for a certain time period or geographic region, etc.) are also added to the reconstructed document.

The reconstructed document's table of contents indexes the content of the document into a description of the overall structure of the document, including chapter headings and sub-chapter headings. Within each heading, the table of contents identifies the structure of each page. As content is added dynamically to the reconstructed document, the content is indexed and added to the table of contents to maintain a current representation of the document's structure. The process performed by the publishing system 130 to reconstruct a document and generate a table of contents is described further with respect to FIG. 3.

The distribution system 140 packages content for delivery, uploads the content to content distribution networks, and makes the content available to end users based on the content's digital rights management policies. In one embodiment, the distribution system 140 includes digital content management, content delivery, and data collection and analysis subsystems.

Whether the ingested document is in a markup language document or is reconstructed by the publishing system 130, the distribution system 140 may aggregate additional content layers from numerous sources into the ingested or reconstructed document. These layers, including related content, advertising content, social content, and user-generated content, may be added to the document to create a dynamic, multilayered document. For example, related content may comprise material supplementing the foundation document, such as study guides, self-testing material, solutions manuals, glossaries, or journal articles. Advertising content may be uploaded by advertisers or advertising agencies to the publishing platform, such that advertising content may be displayed with the document. Social content may be uploaded to the publishing platform by the user or by other nodes (e.g., classmates, teachers, authors, etc.) in the user's social graph. Examples of social content include interactions between users related to the document and content shared by members of the user's social graph. User-generated content includes annotations made by a user during an eReading session, such as highlighting or taking notes. In one embodiment, user-generated content may be self-published by a user and made available to other users as a related content layer associated with a document or as a standalone document.

As layers are added to the document, page information and metadata of the document are referenced by all layers to merge the multilayered document into a single reading experience. The publishing system 130 may also add information describing the supplemental layers to the reconstructed document's table of contents. Because the page-based document ingested into the management block 102 or the reconstructed document generated by the publishing system 130 is referenced by all associated content layers, the ingested or reconstructed document is referred to herein as a "foundation document," while the "multilayered document" refers to a foundation document and the additional content layers associated with the foundation document.

The back-office system 150 of management block 102 enables business processes such as human resources tasks, sales and marketing, customer and client interactions, and technical support. The eCommerce system 160 interfaces with back office system 150, publishing 130, and distribution 140 to integrate marketing, selling, servicing, and receiving payment for digital products and services.

Delivery block 103 of an educational digital publication and reading platform distributes content for user consumption by, for example, pushing content to edge servers on a content delivery network. Experience block 104 manages user interaction with the publishing platform through browser application 170 by updating content, reporting users' reading and other educational activities to be recorded by the platform, and assessing network performance.

In the example illustrated in FIG. 1, the content distribution and protection system is interfaced directly between the distribution sub-system 140 and the browser application 170, essentially integrating the digital content management (DCM), content delivery network (CDN), delivery modules, and eReading data collection interface for capturing and serving all users' content requests. By having content served dynamically and mostly on-demand, the content distribution and protection system effectively authorizes the download of one page of content at a time through time-sensitive dedicated URLs which only stay valid for a limited time, for example a few minutes in one embodiment, all under control of the platform service provider.

Platform Content Processing and Distribution

Figure 1B:
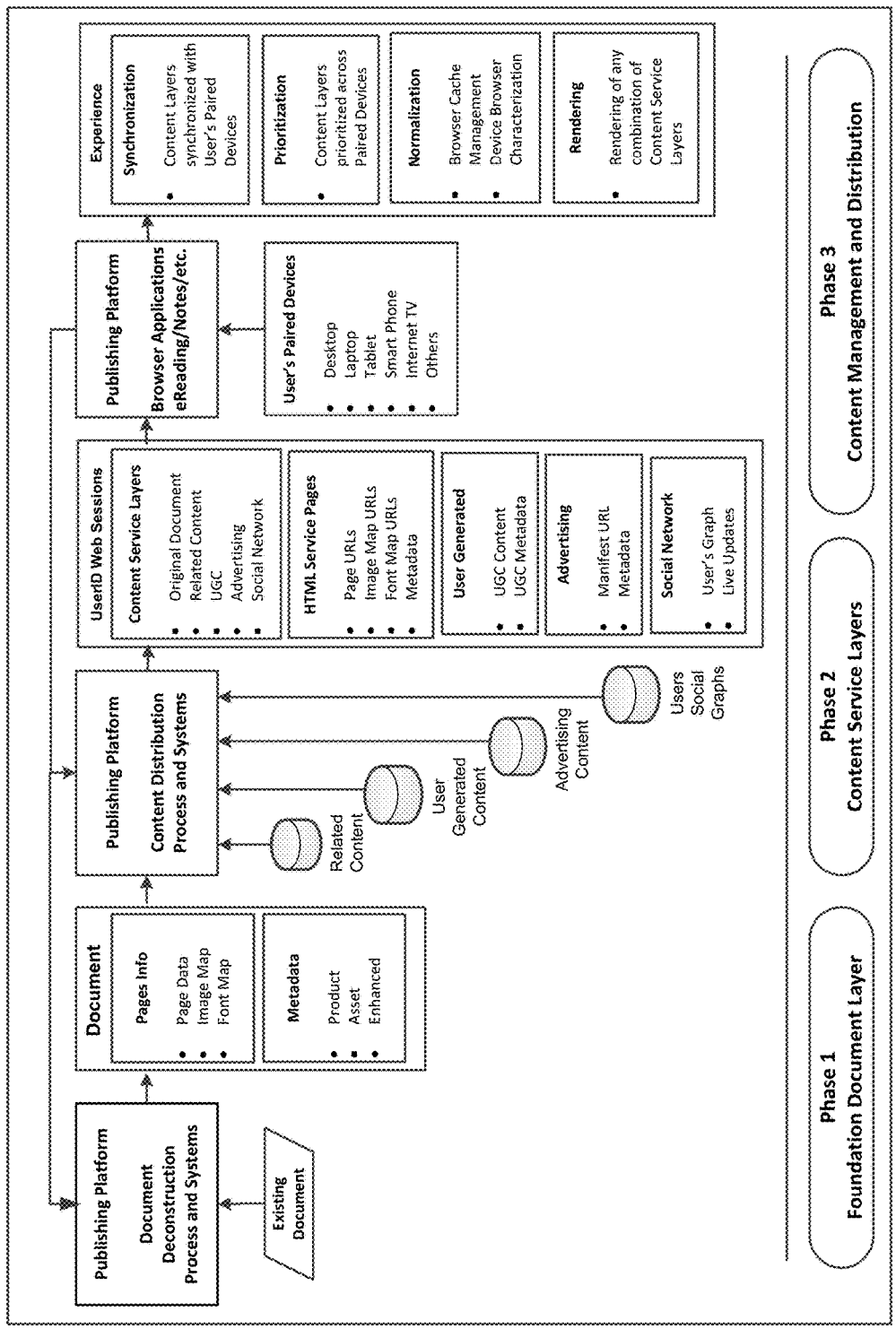
FIG. 1B is a block diagram illustrating interactions with a publishing platform, according to one embodiment.

The platform content catalog is a mosaic of multiple content sources which are collectively processed and assembled into the overall content service offering. The content catalog is based upon multilayered publications that are created from reconstructed foundation documents augmented by supplemental content material resulting from users' activities and platform back-end processes. FIG. 1B illustrates an example of a publishing platform where multilayered content document services are assembled and distributed to desktop, mobile, tablet, and other connected devices. As illustrated in FIG. 1B, the process is typically segmented into three phases: Phase 1: creation of the foundation document layer; Phase 2: association of the content service layers to the foundation document layer; and Phase 3: management and distribution of the content.

During Phase 1, the licensed document is ingested into the publishing platform and automatically reconstructed into a series of basic elements, while maintaining page fidelity to the original document structure. Document reconstruction will be described in more detail below with reference to FIG. 2.

During Phase 2, once a foundation document has been reconstructed and its various elements extracted, the publishing platform runs several processes to enhance the reconstructed document and transform it into a personalized multilayered content experience. For instance, several distinct processes are run to identify the related content to the reconstructed document, user generated content created by registered users accessing the reconstructed document, advertising or merchandising material that can be identified by the platform and indexed within the foundation document and its layers, and social network content resulting from registered users' activities. By having each of these processes focusing on specific classes of content and databases, the elements referenced within each classes become identified by their respective content layer. Specifically, all the related content page-based elements that are matched with a particular reconstructed document are classified as part of the related content layer. Similarly, all other document enhancement processes, including user generated, advertising and social among others, are classified by their specific content layer. The outcome of Phase 2 is a series of static and dynamic page-based content layers that are logically stacked on top of each other and which collectively enhance the reconstructed foundation document.

During Phase 3, once the various content layers have been identified and processed, the resulting multilayered content are then published to the platform content catalog and pushed to the content servers and distribution network for distribution. By having multilayered content services served dynamically and on-demand through secured authenticated web sessions, the content distribution systems are effectively authorizing and directing the real-time download of page-based layered content services to a user's paired devices. These devices access the services through time sensitive dedicated URLs which, in one embodiment, only stay valid for a few minutes, all under control of the platform service provider. The browser-based applications are embedded, for example, into HTML5 compliant web browsers which control the fetching, requesting, synchronization, prioritization, normalization and rendering of all available content services.

Document Reconstruction

The publishing system 130 receives original documents for reconstruction from the ingestion system 120 illustrated in FIG. 1A. These original documents may include course-related materials such as textbooks, study guides, and assignments; job-related materials such as job listings and job recall materials; or other types of document. In one embodiment, a series of modules of the publishing system 130 are configured to perform the document reconstruction process.

Figure 2:
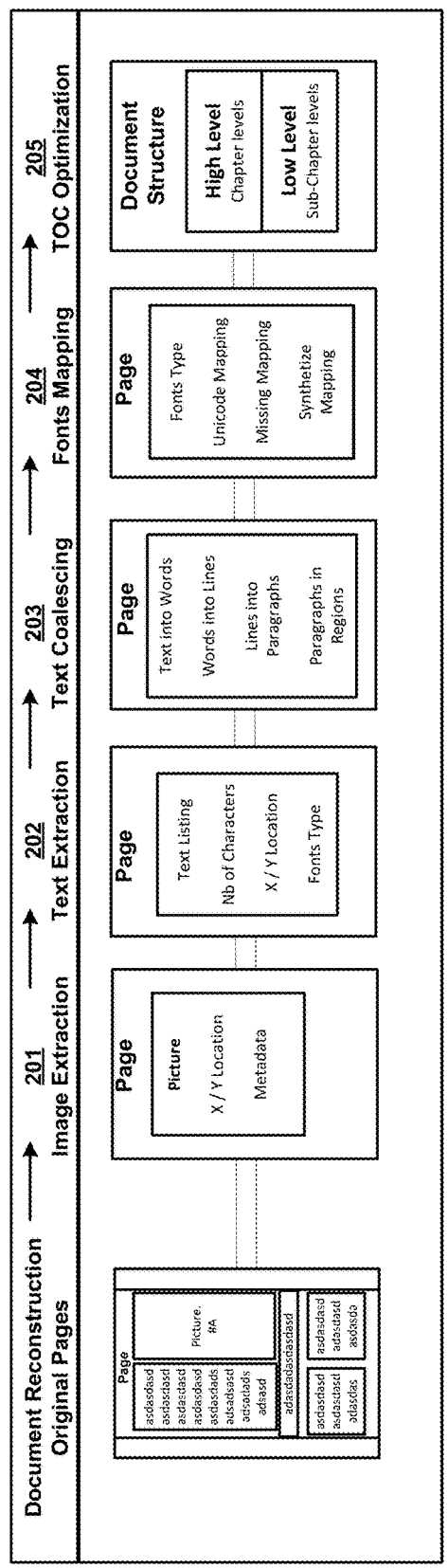
FIG. 2 illustrates a document reconstruction process, according to one embodiment.

FIG. 2 illustrates a process within the publishing system 130 for reconstructing a document. Embodiments are described herein with reference to an original document in the Portable Document Format (PDF) that is ingested into the publishing system 130. However, the format of the original document is not limited to PDF; other unstructured document formats can also be reconstructed into a markup language format by a similar process.

A PDF page contains one or more content streams, which include a sequence of objects, such as path objects, text objects, and external objects. A path object describes vector graphics made up of lines, rectangles, and curves. Path can be stroked or filled with colors and patterns as specified by the operators at the end of the path object. A text object comprises character stings identifying sequences of glyphs to be drawn on the page. The text object also specifies the encodings and fonts for the character strings. An external object XObject defines an outside resource, such as a raster image in JPEG format. An XObject of an image contains image properties and an associated stream of the image data.

During image extraction 201, graphical objects within a page are identified and their respective regions and bounding boxes are determined. For example, a path object in a PDF page may include multiple path construction operators that describe vector graphics made up of lines, rectangles, and curves. Metadata associated with each of the images in the document page is extracted, such as resolutions, positions, and captions of the images. Resolution of an image is often measured by horizontal and vertical pixel counts in the image; higher resolution means more image details. The image extraction process may extract the image in the original resolution as well as other resolutions targeting different eReading devices and applications. For example, a large XVGA image can be extracted and down sampled to QVGA size for a device with QVGA display. The position information of each image may also be determined. The position information of the images can be used to provide page fidelity when rendering the document pages in eReading browser applications, especially for complex documents containing multiple images per page. A caption associated with each image that defines the content of the image may also be extracted by searching for key words, such as "Picture", "Image", and "Tables", from text around the image in the original page. The extracted image metadata for the page may be stored to the overall document metadata and indexed by the page number.

Image extraction 201 may also extract tables, comprising graphics (horizontal and vertical lines), text rows, and/or text columns. The lines forming the tables can be extracted and stored separately from the rows and columns of the text.

The image extraction process may be repeated for all the pages in the ingested document until all images in each page are identified and extracted. At the end of the process, an image map that includes all graphics, images, tables and other graphic elements of the document is generated for the eReading platform.

During text extraction 202, text and embedded fonts are extracted from the original document and the locations of the text elements on each page are identified.

Text is extracted from the pages of the original document tagged as having text. The text extraction may be done at the individual character level, together with markers separating words, lines, and paragraphs. The extracted text characters and glyphs are represented by the Unicode character mapping determined for each. The position of each character is identified by its horizontal and vertical locations within a page. For example, if an original page is in A4 standard size, the location of a character on the page can be defined by its X and Y location relative to the A4 page dimensions. In one embodiment, text extraction is performed on a page-by-page basis. Embedded fonts may also be extracted from the original document, which are stored and referenced by client devices for rendering the text content.

The pages in the original document having text are tagged as having text. In one embodiment, all the pages with one or more text objects in the original document are tagged. Alternatively, only the pages without any embedded text are marked.

The output of text extraction 202, therefore, a dataset referenced by the page number, comprising the characters and glyphs in a Unicode character mapping with associated location information and embedded fonts used in the original document.

Text coalescing 203 coalesces the text characters previously extracted. In one embodiment, the extracted text characters are coalesced into words, words into lines, lines into paragraphs, and paragraphs into bounding boxes and regions. These steps leverage the known attributes about extracted text in each page, such as information on the text position within the page, text direction (e.g., left to right, or top to bottom), font type (e.g., Arial or Courier), font style (e.g., bold or italic), expected spacing between characters based on font type and style, and other graphics state parameters of the pages.

In one embodiment, text coalescence into words is performed based on spacing. The spacing between adjacent characters is analyzed and compared to the expected character spacing based on the known text direction, font type, style, and size, as well as other graphics state parameters, such as character-spacing and zoom level. Despite different rendering engines adopted by the browser applications 170, the average spacing between adjacent characters within a word is smaller than the spacing between adjacent words. For example, a string of "Berriesaregood" represents extracted characters without considering spacing information. Once taking the spacing into consideration, the same string becomes "Berries are good," in which the average character spacing within a word is smaller than the spacing between words.

Additionally or alternatively, extracted text characters may be assembled into words based on semantics. For example, the string of "Berriesaregood" may be input to a semantic analysis tool, which matches the string to dictionary entries or Internet search terms, and outputs the longest match found within the string. The outcome of this process is a semantically meaningful string of "Berries are good." In one embodiment, the same text is analyzed by both spacing and semantics, so that word grouping results may be verified and enhanced.

Words may be assembled into lines by determining an end point of each line of text. Based on the text direction, the horizontal spacing between words may be computed and averaged. The end point may have word spacing larger than the average spacing between words. For example, in a two-column page, the end of the line of the first column may be identified based on it having a spacing value much larger than the average word spacing within the column. On a single column page, the end of the line may be identified by the space after a word extending to the side of the page or bounding box.

After determining the end point of each line, lines may be assembled into paragraphs. Based on the text direction, the average vertical spacing between consecutive lines can be computed. The end of the paragraph may have a vertical spacing that is larger than the average. Additionally or alternatively, semantic analysis may be applied to relate syntactic structures of phrases and sentences, so that meaningful paragraphs can be formed.

The identified paragraphs may be assembled into bounding boxes or regions. In one embodiment, the paragraphs may be analyzed based on lexical rules associated with the corresponding language of the text. A semantic analyzer may be executed to identify punctuation at the beginning or end of a paragraph. For example, a paragraph may be expected to end with a period. If the end of a paragraph does not have a period, the paragraph may continue either on a next column or a next page. The syntactic structures of the paragraphs may be analyzed to determine the text flow from one paragraph to the next, and may combine two or more paragraphs based on the syntactic structure. If multiple combinations of the paragraphs are possible, reference may be made to an external lexical database, such as WORDNET®, to determine which paragraphs are semantically similar.

In fonts mapping 204, in one embodiment, a Unicode character mapping for each glyph in a document to be reconstructed is determined. The mapping ensures that no two glyphs are mapped to a same Unicode character. To achieve this goal, a set of rules is defined and followed, including applying the Unicode mapping found in the embedded font file; determining the Unicode mapping by looking up postscript character names in a standard table, such as a system TrueType font dictionary; and determining the Unicode mapping by looking for patterns, such as hex codes, postscript name variants, and ligature notations.

For those glyphs or symbols that cannot be mapped by following the above rules, pattern recognition techniques may be applied on the rendered font to identify Unicode characters. If pattern recognition is still unsuccessful, the unrecognized characters may be mapped into the private use area (PUA) of Unicode. In this case, the semantics of the characters are not identified, but the encoding uniqueness is guaranteed. As such, rendering ensures fidelity to the original document.

In table of contents optimization 205, content of the reconstructed document is indexed. In one embodiment, the indexed content is aggregated into a document-specific table of contents that describes the structure of the document at the page level. For example, when converting printed publications into electronic documents with preservation of page fidelity, it may be desirable to keep the digital page numbering consistent with the numbering of the original document pages.

The table of contents may be optimized at different levels of the table. At the primary level, the chapter headings within the original document, such as headings for a preface, chapter numbers, chapter titles, an appendix, and a glossary may be indexed. A chapter heading may be found based on the spacing between chapters. Alternatively, a chapter heading may be found based on the font face, including font type, style, weight, or size. For example, the headings may have a font face that is different from the font face used throughout the rest of the document. After identifying the headings, the number of the page on which each heading is located is retrieved.

At a secondary level, sub-chapter headings within the original document may be identified, such as dedications and acknowledgments, section titles, image captions, and table titles. Vertical spacing between sections, text, and/or font face may be used to segment each chapter. For example, each chapter may be parsed to identify all occurrences of the sub-chapter heading font face, and determine the page number associated with each identified sub-chapter heading.

Generating Job Recall Materials

Figure 3:
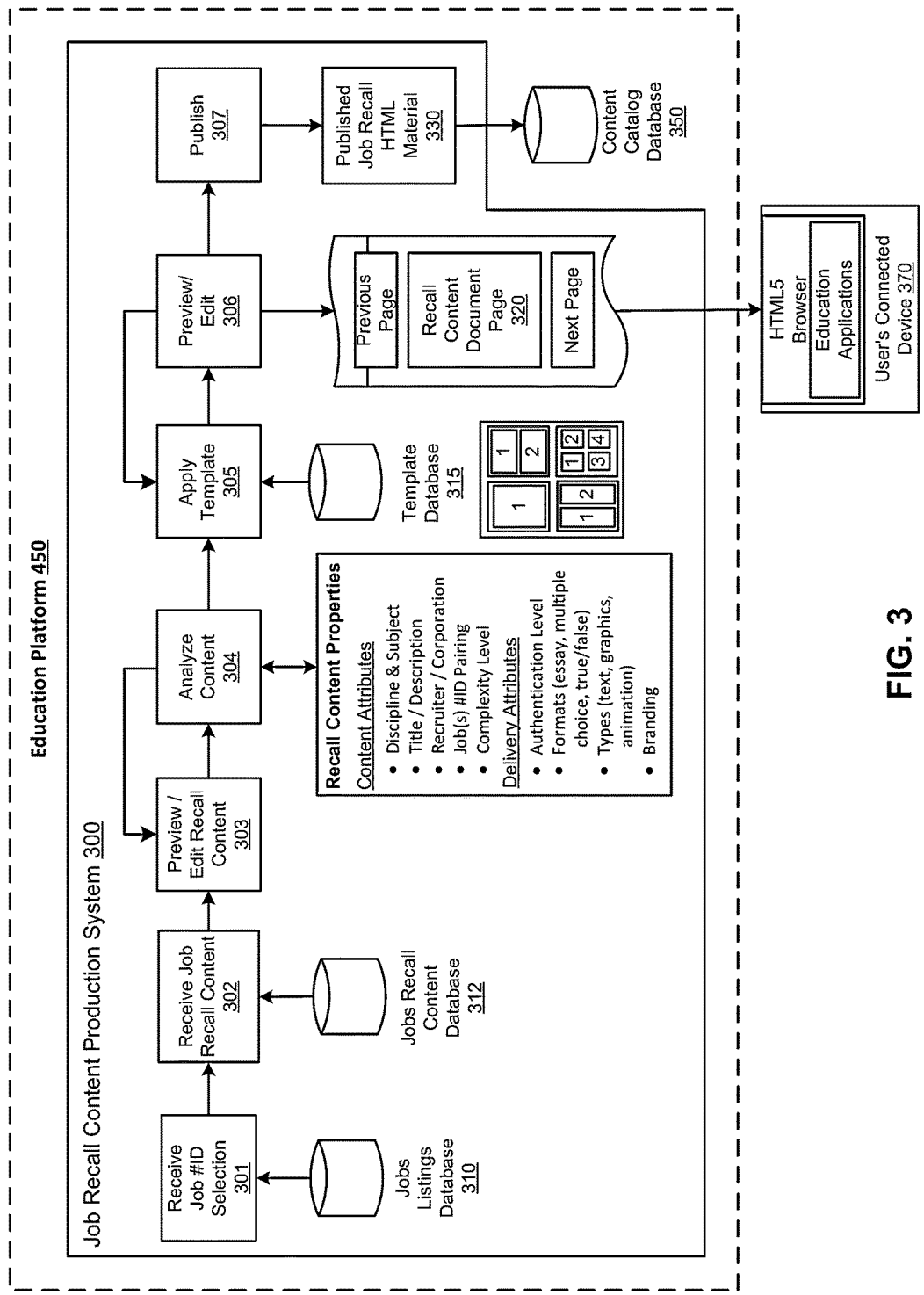
FIG. 3 illustrates a process for generating and publishing job recall activities, according to one embodiment.

FIG. 3 illustrates a process for generating and publishing job recall materials, according to one embodiment. Job recall materials may be created by a recruiter from an organization for a particular job opening or a class of jobs. In one embodiment, the process illustrated in FIG. 3 is performed by a job recall content production system 300 in response to inputs received from a user. The job recall content production system 300 is, in some embodiments, integrated into an education platform 450, which may have components in common with the functional blocks of the platform environment 100 illustrated in FIG. 1. In other embodiments, the job recall content production system 300 is a separate system from the education platform 450 and the platform environment 100. The user interacting with the production system 300 to create job recall materials is referred to as a recruiter, although users having other roles may also interact with the production system 300 to create and publish job recall materials.

The production system 300 receives 301 from the recruiter an identifier of at least one job listing. In one embodiment, the received identifier specifies a job or class of jobs in a job listings database 310 maintained by the education platform 450. The job listings database 310 includes job listings uploaded to the education platform 450 by recruiters. Alternatively, the education platform 450 may generate the job listings database 310 by importing job listings from external sources, such as employment websites. In another embodiment, the received job listing identifier identifies a job listing or class of jobs in an external database.

The production system 300 receives 302 job recall content. In one embodiment, the received job recall content is uploaded by the recruiter or generated by the recruiter interacting with the production system 300. The uploaded content may be reconstructed into a markup language format by the publishing system 130 according to the process described with respect to FIG. 2. In another embodiment, the production system 300 retrieves existing job recall content from the job recall content database 312 using an identifier of the content supplied by the recruiter.

The production system 300 displays the content to the recruiter for previewing and editing 303 and content analysis 304. During content analysis 304, the production system 300 associates a set of properties with the job recall content. The production system 300 may receive the properties from the recruiter, or may automatically determine the properties of the content. Properties of job recall materials include content attributes and delivery attributes. Several examples of content attributes and delivery attributes are illustrated in FIG. 3. The content attributes associated with the job recall content in step 304 may include a concept tested by or associated with the job recall content, title and/or description of the content, a job or class of jobs with which the job recall content is associated, and complexity level of the content. Delivery attributes include, for example, authentication level, a format for delivery of the content, types of content that are to be delivered, and any branding of the content (e.g., corporate affiliation of the content).

After associating properties with the job recall content, the production system 300 optionally applies 305 a template to the job recall content. In one embodiment, the production system 300 retrieves a template from a template database 315 and populates the template with job recall content. Each template is a formatted document with regions configured to receive job recall content. By populating a template with the job recall content, the production system 300 generates a markup language job recall material.

The job recall material is displayed to the recruiter for preview/edit 306. FIG. 3 illustrates an example page 320 of the job recall material, displayed to the recruiter by a browser executing on a connected device 370. The recruiter can edit or modify the recall material by, for example, selecting a different template, rearranging the order or layout of the populated template regions, manually entering content into the regions, or revising content in the template regions.

After the job recall material has been finalized, the production system 300 publishes 307 the material. The published job recall material 330 is added to the content catalog 350 of the education platform 450 and made available for distribution to end users.

Job Recall Services

Figure 4:
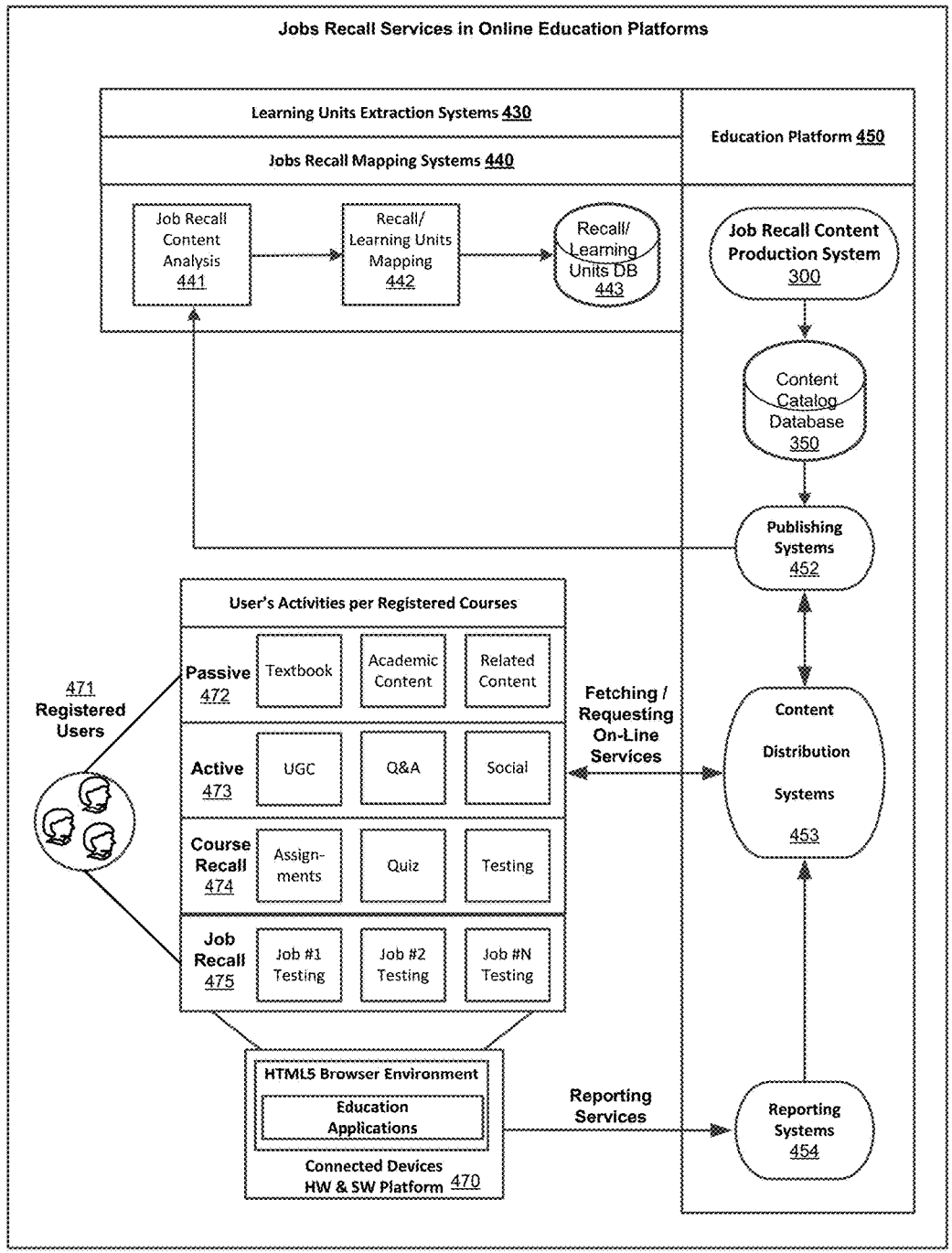
FIG. 4 illustrates a job recall services system, according to one embodiment.

FIG. 4 illustrates an overview of a job recall services system, according to one embodiment. FIG. 4 demonstrates interactions between course extraction systems 430, job recall mapping systems 440, the education platform 450, and an HTML5 browser environment 470. In some embodiments, the course extraction systems 430 and job recall mapping systems 440 may be integrated as part of the education platform 450 and/or the platform environment 100 illustrated in FIG. 1, and in other embodiments they may be separate systems. Likewise, the HTML5 browser environment 470 may be the same as the eReading application 170 of the experience block 104 of the platform environment 100, or the functionality may be implemented in different systems or modules.

The education platform 450 serves education services to registered users 471 based on a process of requesting and fetching on-line services in the context of authenticated on-line sessions. In the example illustrated in FIG. 4, the education platform 450 includes a content catalog database 350, publishing systems 452, content distribution systems 453, and reporting systems 454. The content catalog database 350 contains the collection of content available via the education platform 350. The content catalog database 350 feeds the content to the publishing systems 452. The publishing systems 452 serve the content to registered users 471 via the content distribution system 453. Reporting systems 454 receive reports of user experience and user activities from the connected devices 470 operated by the registered users 471. This feedback is used by content distribution system 453 for managing the distribution of the content and for capturing user-generated content and other forms of user activities to add to the content catalog database 350.

The course extraction systems 430 receive published content from the publishing systems 452 for analysis and provide a mapping of concepts to activities for storage in the recall/learning units database 444. The course extraction systems 430 analyze content available from the content catalog database 350. Based on the analysis, the course extraction systems 430 extract concepts and user activities from the analyzed content to determine a list of concepts and a list of activities. Processes performed by the course extraction systems 430 for extracting concepts and activities will be described further with respect to FIGS. 6A-B The user activities extracted by the course extraction systems 430 are categorized as passive 472, active 473, course recall 474, and job recall 475 activities. Each concept extracted by the course extraction systems 430 is mapped to at least one type of user activity, and may be mapped to all four types of user activities.

Passive activities 472 include activities in which registered users passively interact with published academic content materials. For example, reference materials for a course typically include one or more published documents, such as textbook, summary, syllabus, and other digital related content which are aggregated at the course level and accessible from the registered users' connected devices. These activities are defined as "passive" because they are typically orchestrated by each user around multiple on-line reading authenticated sessions when accessing the structured HTML course-based referenced documents. By directly handling the fetching and requesting of all HTML course-based document pages for its registered users, the connected education platform analyzes the passive reading activities within each course, correlating how registered users are interacting with the referenced academic content within any course delivery.

Activities are defined as "active" when registered users interact with course-defined referenced academic documents by creating their own user generated content (user-generated content) layer as managed by the platform services. By contrast to "passive" activities, where content is predetermined, static, and structured as part of a course description, the process of creating user generated content is unique to each user, both in terms of actual material, format, frequency or structure, for example. In this instance, user-generated content is defined by the creation of personal notes, highlights, asking or answering questions, and other comments, or interacting with other registered users 471 through the education platform 450 while accessing the referenced course-based HTML documents. Other types of user-generated content include seeking support from other users, solving problems associated to particular sections of course-based HTML documents, connecting and exchanging feedback with peers, among others. These user-generated content activities are authenticated through on-line "active" sessions that are processed and correlated by the platform content distribution system 453 and reporting system 454. By directly handling the fetching and requesting of all user-generated content for registered users, the platform 450 can correlate how registered users add their user-generated content layer within any course delivery.

Course recall activities 474 test registered users against knowledge acquired from their previous passive and active sessions for evaluating the registered users in an educational course. By contrast to the previous passive and active sessions, recall activities are characterized by the combination of distributing predetermined content items and capturing user generated content associated therewith. These predetermined content items include, for example, assignments, quizzes, and other testing materials associated with a particular course that are offered to registered users. Typically, a set of predetermined questions which are aggregated by the platform 450 into a digital testing material is described as a structured HTML document that is published either as a stand-alone document or as supplemental to a course-based document. As users interact with the testing materials by, for example, answering questions set forth in the materials, the platform content distribution 453 and reporting systems 454 process the user's answers and store them as user-generated content. By directly handling the fetching and requesting of all testing content for registered users, the platform 450 captures course recall activities, which are data sets describing how registered users interact with the testing documents.

Job recall activities 475 test registered users against knowledge needed for a particular job opening or class of jobs. Similar to course recall activities, job recall activities are characterized by the combination of distributed predetermined content and captured user-generated content. However, as discussed above, a job recall activity is defined by a recruiter as a tool for ascertaining whether job candidates have acquired desired skills or knowledge for a job or class of jobs, whereas course recall activities are typically defined by an instructor of a course as a tool for assessing and quantifying students' understanding of the concepts taught in the course. In one embodiment, the job recall materials corresponding to the job recall activities 475 are uploaded to the catalog database 350 by recruiters interacting with the job recall content production system 300, as described with respect to FIG. 3.

The job recall mapping systems 440 analyze job recall materials in the content catalog database 350 and map the job recall materials to learning units extracted by the course extraction systems 430. In one embodiment, the job recall mapping systems 440 include modules for job recall content analysis 441 and recall/learning units mapping 442, as well as a recall/learning units database 443.

The job recall content analysis module 441 analyzes job recall content to extract a set of properties of the job recall content, including at least a concept associated with the recall content. In one embodiment, the properties are specified by recruiters who upload the job recall content and associated with the job recall content as metadata. In this case, the job recall content analysis module 441 extracts the metadata from the job recall content and parses it into properties. In another embodiment, the job recall content analysis module 441 determines the properties of the job recall content based on analysis of the content. For example, the analysis module 441 may use semantic analysis to determine a concept tested by the job recall content.

The recall/learning units mapping module 442 uses the extracted properties of the job recall content to map job recall materials to learning units. In one embodiment, the recall/learning units mapping module 442 maps a job recall material to one or more learning units by matching the concept of the job recall material to a concept of a learning unit. The mapping module 442 may filter the learning units having a matching concept using a subject and/or a sub-subject of the learning unit. In this case, the subject and sub-subject may be determined from a job posting associated with the job recall activity. For example, a job recall material tests a concept within linear algebra. Since the job recall material is associated with a job posting for a computer scientist, the mapping module 442 filters the learning units having the tested concept by the "computer science" subject. That is, the mapping module 442 selects learning units having the tested concept that are part of a computer science course or otherwise associated with the subject "computer science," and maps the job recall material to the selected learning units. In one embodiment, the mappings between job recall materials and learning units is stored in the recall/learning units database 443.

Figure 5:
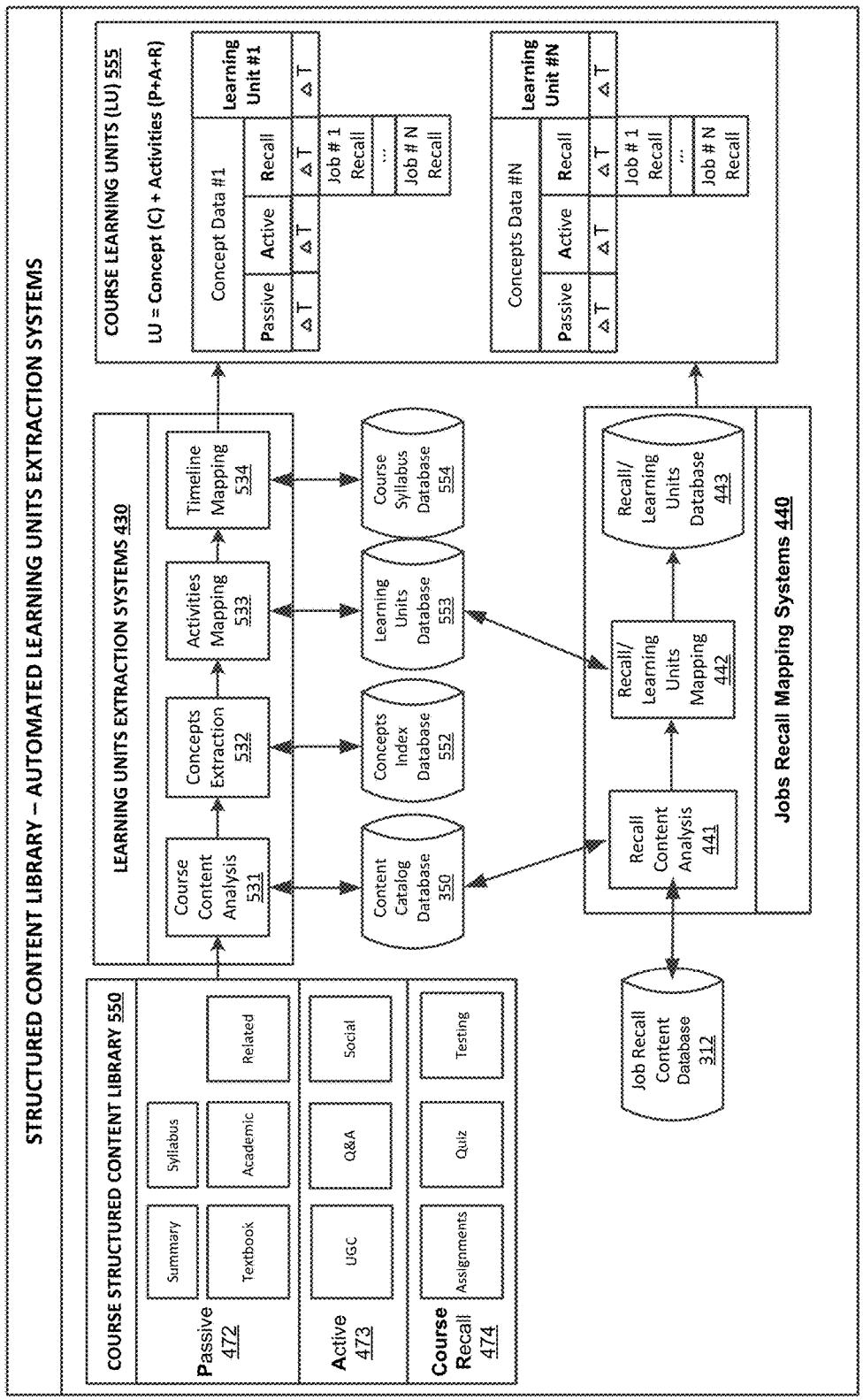
FIG. 5 illustrates the operation of job recall mapping systems, according to one embodiment.

Processes for deconstructing courses into learning units and mapping job recall materials to the learning units are illustrated in FIG. 5. FIG. 5 illustrates the operation of the learning units extraction systems 430 and job recall mapping systems 440, according to one embodiment. In one embodiment, the learning units extraction systems 430 include modules for course content analysis 531, concepts extraction 532, activities mapping 533, and timeline mapping 534. The extraction of learning units drives the identification of activities in which users can be predicted to engage during the delivery of a course. Generally, the extraction is performed by atomizing the courses that users take into individual learning concepts. A general model of learning is then applied to these individual concepts in order to determine what activities the users will likely be performing.

In the example of FIG. 5, the course structured content library 550 is made up of data that supports passive 472, active 473, and course recall 474 activities that a registered user 471 may undertake as part of the user's study of at least one course. The course structured content library 550 may exist within the content catalog database 350. The content analysis module 531 analyzes the materials that make up and/or are generated by these passive 472, active 473, and course recall 474 activities along with additional documents from the content catalog database 350, and indexes them for the concepts extraction module 532. The concepts extraction module 532 ranks the content affiliated per course of a plurality of courses and processes the content by extracting and normalizing the content into a unique combination of operands and operators that characterize the respective course. Each extracted combination of operand and operator forms a concept. As concepts are extracted by the concepts extraction module 532, they are indexed into the concepts index database 552. Then, the concepts are mapped to the activities that engage users who are studying those concepts as part of at least one course by the activities mapping module 533. The activities are also mapped to a timeline by start time, end time, and/or elapsed time of the activities that are undertaken by a timeline mapping module 534. The timeline mapping is informed by a course syllabus database 554 that contains information about course dates, lesson plans, or the like. The respective mappings of activities and timeline for each concept are stored in the learning units database 553.

The job recall content database 510 stores information about job recall activities. In one embodiment, the job recall content database 510 is a component of the content catalog database 350 of the education platform 450. The recall content analysis module 441 of the job recall mapping systems 450 analyzes job recall materials in the job recall content database 510 to extract a concept from each job recall material. Using the extracted concept, the recall/learning units mapping module 443 maps the job recall material to one or more learning units in the learning units database 553, and stores the mapping in the recall/learning units database 443.

As depicted in FIG. 5, course learning units 555 are output of the learning units extraction systems 440 and job recall mapping systems 440. Course learning units 555 are composed of the mapping between a concept and the activities that are performed by a user that are related to that concept within the time boundaries of an educational course, including passive, active, course recall, and job recall activities. The coupling of one concept to at least one activity collectively defines a discrete learning unit. The learning unit attributes are expressed as the unique combination of a single concept with its mapped activities. A course is composed of a plurality of learning units, which may each be associated with a start time, an end time, a length of time, or an elapsed time in which the learning unit is studied and the activities associated with the learning unit are performed. Once a course has been deconstructed into a plurality of learning units, the learning units can be shuffled into different orders. Alternatively or additionally, once a plurality of courses have been deconstructed into discrete learning units, the learning units can be mixed, matched, or assembled into new courses.

Learning Units Extraction

Figure 6A:
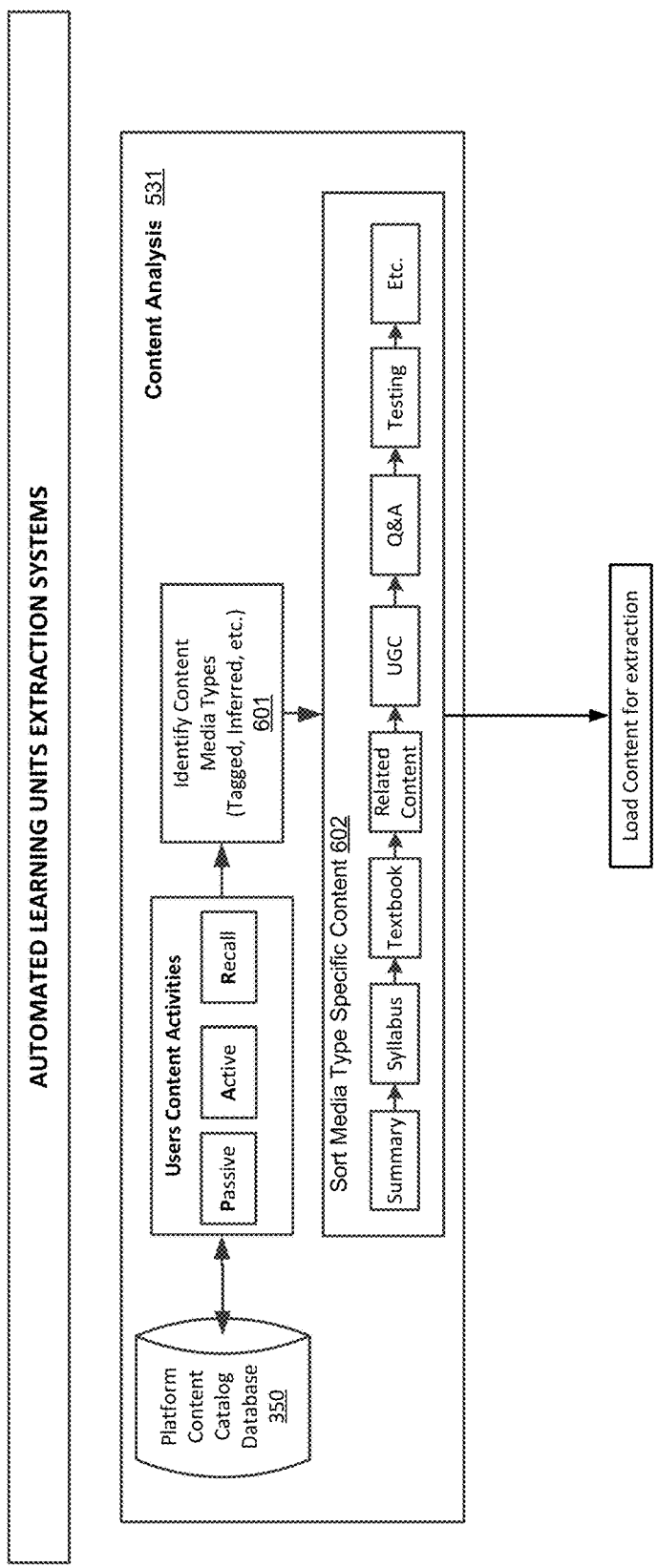
FIGS. 6A and 6B illustrate a process of learning unit extraction performed by automated learning units extraction systems, according to one embodiment.
Figure 6B:
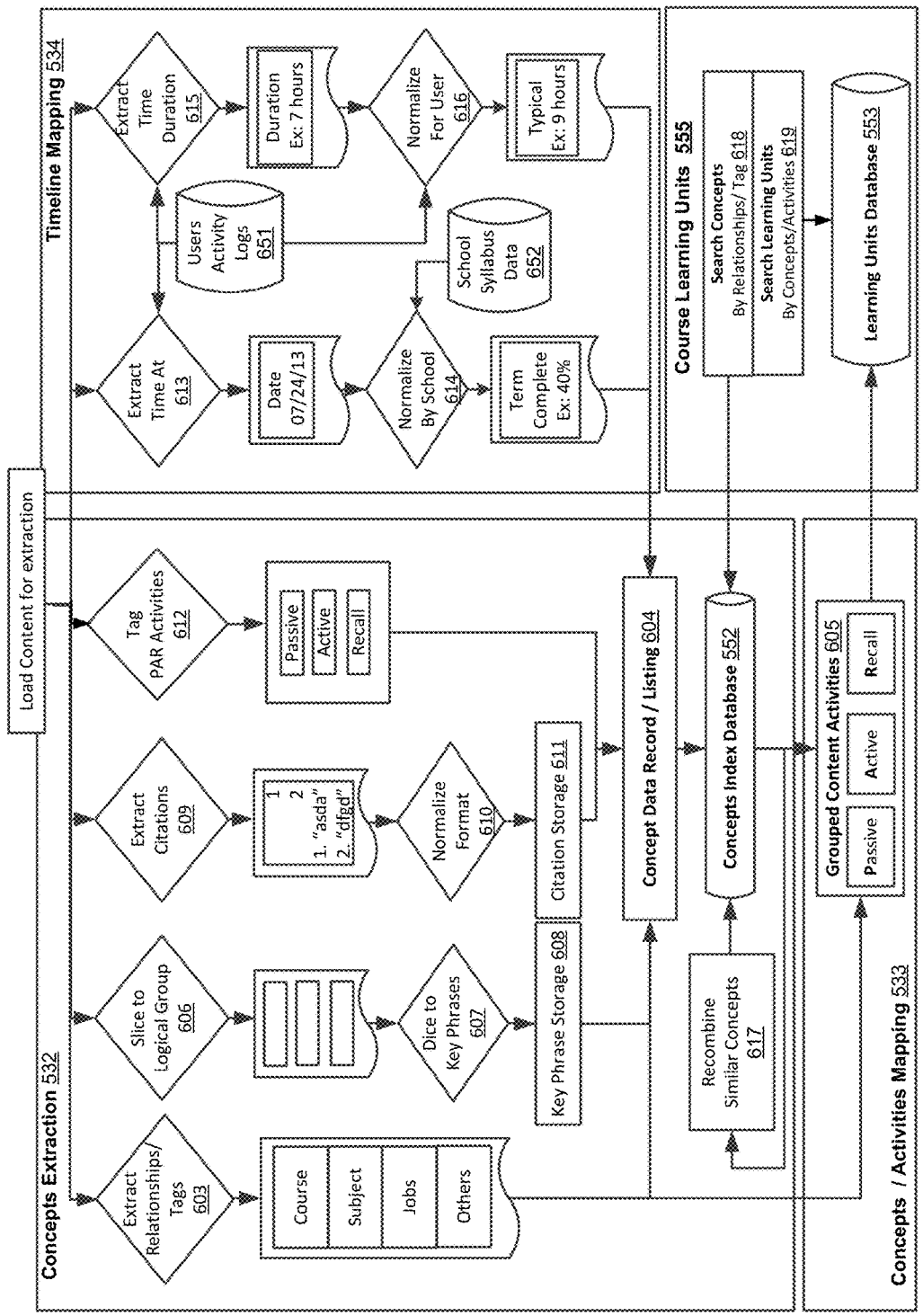

FIGS. 6A-B illustrate a process of learning unit extraction performed by automated learning units extraction systems 430, according to one embodiment. As illustrated in FIG. 6A, content analysis 531 begins with materials from the platform content catalog database 350 which have been associated with passive, active, and recall user activities. In step 601, content media types are identified. The media types may be inferred from data from the content catalog database 350 or the users' content activities, or the media types may be explicitly tagged. Certain media types, such as a summary of a course and a course syllabus, may tend to be more reliable and indicative of the learning units that will be studied in a course than other media types, such as related content and user-generated content, which may only be tangentially related to the learning units studied in the course. The identification of the media types in step 601 allows the media types to be sorted in step 602. The media types may be sorted for example, in descending order of reliability or importance in terms of containing valuable concepts for extraction as the basis of a learning unit. In one embodiment, the media types are ordered as follows: summary, syllabus, textbook, related content, user-generated content, Q&A, and testing materials, with all other materials following. The summary, syllabus, and textbook may be considered primary sources, whereas the remainder of the sources may be considered secondary sources. The content is loaded in the sorted order for extraction.

FIG. 6B continues FIG. 6A at the point that content has been loaded for extraction. The concepts extraction module 532 and the timeline mapping module 534 illustrate several processing steps that may be undertaken sequentially or in parallel for each media type.

In step 603, relationships and tags are extracted from the loaded content. In one embodiment, these relationships are the relationships between the content and the course, subject of study, jobs relevant to the field of study, and any other field that may be tracked by an education platform. The relationships may be explicitly tagged within the content catalog database 350. These explicit tags can be fed into the concept data record or listing 604. The tags may also be fed into the grouped content activities 605, which will be discussed in great detail below.

In step 606, the loaded content can be sliced into logical groups. The logical groups may be determined based at least in part on the structure of the loaded content, for example a subsection of a textbook, a chapter of a study guide, or a paragraph of a course summary. Then, in step 607, the logical groups are diced into key phrases 607 using language analysis. Generally, the key phrases are candidates for concepts, and are composed of a combination of an operator and an operand. The operator is an action performed by a student while the operand is an object on which the action is performed, and the combination of operator and operand defines a particular concept. Either can be narrow or broad. For example, "Perspectives of Free Black Soldiers in the American Civil War" is a narrow operand, but the operator for a student studying it is a broad action such as "compare," "contrast," "analyze" "look for trends and patterns," or "develop an opinion or argument for an underlying reason or structure." By contrast, a narrow action "determining the linear independence of a system of equations," can be applied to a wide range of different operands in fields such as mathematics, engineering, computer science, and economics. In one embodiment, the key phrases determined from the logical groups either have a specific operator or operand. Concepts in which both operator and operand are broad and generic are listed as undefined because they lack meaningful boundaries. Concepts in which both are specific tend not to be as useful in some embodiments, although they are practical when learning to do repetitive tasks. As a result, the undefined key phrases which are identified may be listed separately and/or excluded from further processing. The key phrases that are identified from the loaded content are stored in step 608 as part of the concept data record 604.

In step 609, citations are extracted for character strings (e.g., character strings that have been identified as key phrases or may be text recitations of concepts). For example, for each loaded content item, the citations for a text string are indexed. In step 610, the text strings are normalized in format, for example by removing unwanted characters, eliminating punctuation, and standardizing language (e.g., making nouns singular or plural, truncating verbs, or the like). The normalized citations are then stored in step 611 as part of the concept data record 604.

In step 612, the loaded content is tagged as stemming from passive, active, and recall activities undertaken by users. The tags are also passed to the concept data record 604.

In step 613, as part of the timeline mapping module 444, the loaded content is analyzed to extract the time which is relevant to the content, for example, when pages were read, when a quiz was completed, when an assignment was started, or the like, as informed by the users activity logs 651. In step 614, by referencing the school syllabus data 652, the process can normalize the extracted time relevant to the content according to the school in order to determine a relative time within the course at which the content was acted upon. For example, if a section of a textbook was read in the fourth week of a 10 week summer course, it could be normalized to being studied when 40% of the term was complete, and thus compared against the normalized timing of reading the section of a textbook 40% through a longer Fall semester, or against the timing of reading of the section of a textbook in previous summer terms. The normalized timing of activities is stored in the concepts data record 604. In one embodiment, the normalized timing of activities may be reported for use in updating the school syllabus data 652 to be responsive to adjustments in the flow of the course delivery. Depending on circumstances, a class may linger on a learning unit longer than planned at the outset of the course, for example, and the reported normalized timing of activities can be used to dynamically update the course syllabus according to the reality of the course delivery.

In step 614, also as part of the timeline mapping module 444, the loaded content is analyzed to extract the time duration of an activity, for example how long a user spent reading a chapter, working on a problem set, or the like, as informed by the user's activity logs 651. For example, a student may have spent 7 hours studying a chapter of a textbook, as indicated by the elapsed time in each of a user's reading sessions for that chapter recorded in the user activity log 651. The user's individual time can be normalized across users in step 616 by referring to user activity logs 651 to determine a typical duration for the activity. The user's specific duration or the normalized duration may also be stored in the concepts data record 604. In one embodiment, the normalized duration of activities may be reported, for example, for use in planning future iterations of a course. By knowing on average how long students spend on each activity in a learning unit, an appropriate duration of the learning unit and an appropriate number of learning units for a course can be planned so that the course fits within the school schedule and engages students at an appropriate level of involvement.

As described above, several processes of the concepts extraction module 532 and the timeline mapping module 534 have populated the concept data record 604, which is indexed by the concepts index database 552. In step 617, similar concepts can be combined and collapsed into one concept in the concepts index database 552 to avoid duplication and simplify the database 552. Such a recombination process may be performed iteratively as new content is loaded for extraction and analyzed. It is noted that while some concepts may be uncommon in a particular course, such as covering the personally favored topics of a particular instructor, a great many are shared between courses that share the same logical curricular block. For example, every course on "beginning linear algebra" covers the topic "linear independence." Therefore, the extraction systems are effectively building up the list of concepts for courses over time even when the list is not complete for a given course iteration.

The concepts index database 552 can be used together with the grouped content activities 605 to create a learning unit. The association between a concept from the concepts index database 552 and the passive, active, and recall activities 605 that a student undertakes to study the concept together make up the learning unit, which is stored in the learning units database 553. Accordingly, by using course learning units 555, an interested party can search concepts by relationships or tags in step 618 through the concepts index database 552, or an interested party can search learning units by concepts or activities in step 619 through the learning units database 553. The interested party may be a student seeking to fill gaps in their education, a teacher planning a course, an administrator organizing a curriculum, an employer designing job requirements or seeking job applicants, or any other person or system interested in how students engage in their education on a digital education platform.

Correlating Job Recall Activities to Courses Based on Learning Units

Figure 7:
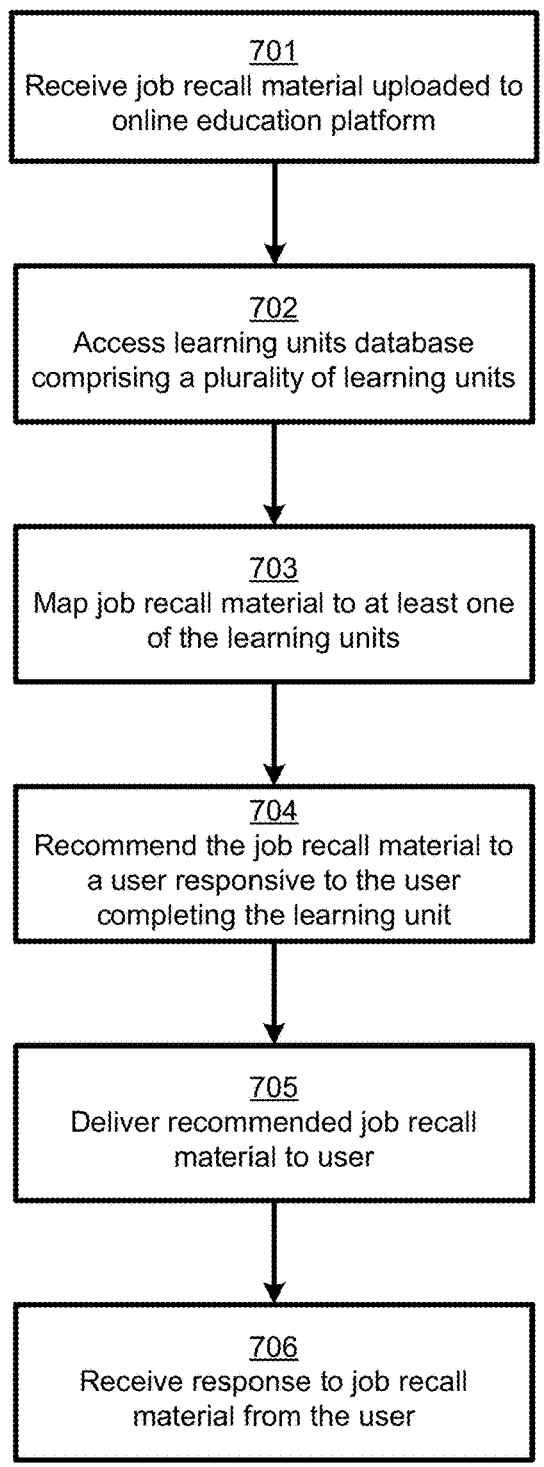
FIG. 7 illustrates an example method of correlating job recall materials to educational courses, according to one embodiment.

FIG. 7 is a flowchart illustrating a process for correlating job recall materials to educational courses, according to one embodiment. In one embodiment, the steps of the process are performed by the job recall mapping systems 440. Other embodiments may perform fewer or additional steps, and may perform the steps in different orders.

The job recall mapping systems 440 receive 701 a job recall material uploaded to the online education platform. The job recall material tests users against knowledge or skills desired for a job opening or class of jobs, and may be associated with a particular job listing or class of jobs in the job listings database 310. Furthermore, the job recall material is associated with properties defining at least a concept extracted from the job recall material.

The job recall mapping systems 440 access 702 the learning units database 553 and map 703 the job recall material to at least one of the learning units. Each learning unit in the learning units database 553 includes a distinct concept in an educational course. In one embodiment, the job recall material is mapped 703 to a learning unit by matching the concept extracted from the job recall material to a concept of the learning unit.

After a user has completed the learning unit to which the job recall material is mapped, the job recall mapping systems 440 recommend 704 the job recall material to the user. The job recall activity may be recommended during an educational course, shortly after the user completes the learning unit. For example, the job recall material may be recommended within one week of the user's completion of the learning unit. Alternatively, job recall materials mapped to learning units of an educational course may be recommended to the user in aggregate at the end of the educational course.

If the user desires to complete the recommended job recall material, the job recall material is delivered 705 to the user via a connected device 470. In one embodiment, the job recall material is delivered 705 based on access conditions associated with the material. For example, the delivery may be authorized using login credentials of the user and/or an uploaded image of the user requesting access to the job recall activity. A process for authenticating access to recall materials is described in U.S. patent application Ser. No. 13/935,150, filed Jul. 3, 2013, which is incorporated herein by reference in its entirety.

The job recall mapping systems 440 receive 706 the user's responses to the job recall material (e.g., the user's answers to questions in the material) and store the user responses. The job recall mapping systems 440 may send the user responses to the recruiter without further processing, or the job recall mapping systems 440 may analyze the user responses. For example, in one embodiment, the job recall mapping systems 440 automatically score the received user responses based on a solution key provided by the creator of the job recall material. That is, if a job recall material includes a set of multiple choice questions, the job recall mapping systems 450 score the user's answers to the questions using an answer key for the material. The individual user scores may be reported to the recruiter, or the job recall mapping systems 450 may provide the recruiter with an aggregated representation of user scores.

Accordingly, the recruiter receives information about which users of the education platform 450 completed a given job recall activity as well as how well the users performed on the activity. The recruiter may use the performance information for aiding hiring decisions, such as selecting users to interview for a job requiring completion of the job recall activity.

Structured Courses by Learning Units

Figure 8:
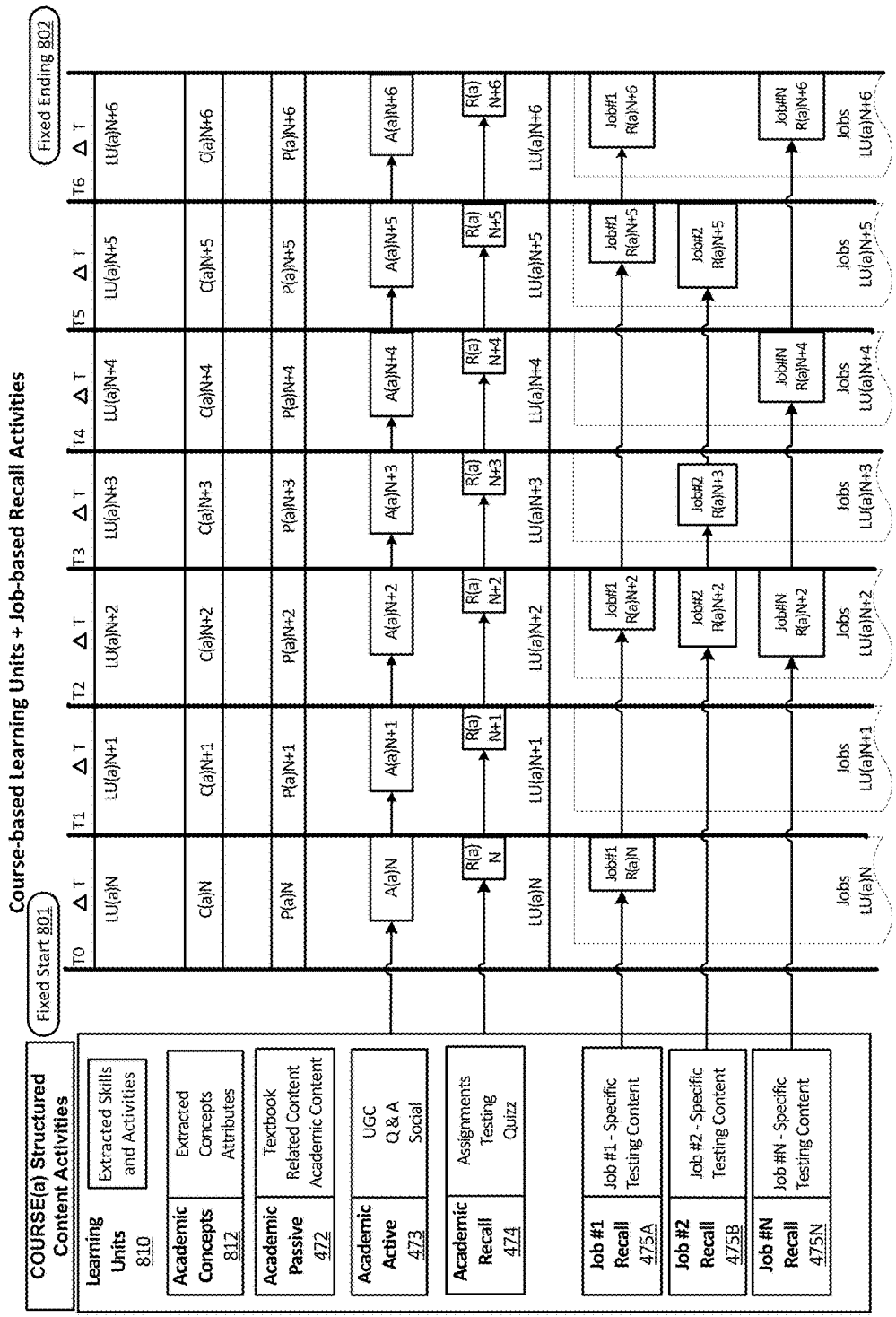
FIG. 8 illustrates an example mapping of job recall activities to a course deconstructed into distinct learning units, according to one embodiment.

As a result of job recall materials being mapped to learning units of deconstructed courses, job recall activities can be readily incorporated into students' academic activities. FIG. 8 illustrates an example course deconstruction into distinct learning units with job recall activities incorporated into the learning units, according to one embodiment. In the diagram, time flows from left to right. As discussed previously, the structure and delivery of a course can be expressed as the aggregation of passive, active, and recall on-line sessions that collectively summarize all the events and content activities associated to that course by the registered users during its actual delivery. Once the learning units have been extracted, the course is effectively atomized into a series of concepts and relevant activities, defining a structure and organization for that course. In this learning model, the course referenced content, such as a textbook, which traditionally defines the structure of the course, is replaced with individual learning units that are more accurate indicators and representations of what students need to achieve. In some embodiments, the modular nature of the learning units allows them to be rearranged, mixed with learning units from other courses, and aggregated in different orders in order adapt learning materials to suit different learning styles, instructor preferences, institutional goals, or for any other reason.

As shown in FIG. 8, the course is deconstructed into a timeline between a fixed start 801 and a fixed ending 802 of a course timeline. The course timeline includes a subdivision that predicts what activities a user studying the course will undertake in each of several time periods throughout the actual delivery of the course. In the example illustrated in FIG. 8, the course is divided into seven equal time periods, but the time periods may vary in length and a course may include additional or fewer time periods in other examples. In one embodiment, the time allotted to each learning unit 810 is predicted based on analytics of user activities reported from previous iterations of a course.

Each learning unit 810 includes a concept 812 and is associated with at least one activity. The activities are completed during the time period associated with each learning unit. In the example illustrated in FIG. 8, each concept 812 is supported by a passive activity 472, an active activity 473, and an academic recall activity 474, but that need not always be the case. In one embodiment, if a learning unit is missing one or more activity types, the extraction system 440 can fill in the activities for a given concept. Depending on the type of concept, the platform 450 suggests a wide range of products and services that can fulfill one of the activity types of the learning unit. For instance, the platform 450 can suggest additional reading for more passive learning, homework help and additional tutoring for active learning, and practice quizzes and tests for course recall, all based on the indexed concepts and activities in the learning units database 553 that correspond to the learning units that a student is studying in a course. These can be useful to the user regardless of whether they are perfectly aligned to the particular assignments that are offered in the school because they are focused on mastering the same concepts. This way, the platform services can monitor users to ensure they are on track to succeeding and prodding them to seek more help if they are falling behind.

In one embodiment, as shown in FIG. 8, a number of job recall activities 475 are added to the course timeline based on the mapping between each activity and a learning unit. As a user completes the learning unit to which a job recall activity is mapped, the job recall activity is recommended to the user. Thus, the user can complete the job recall activities as a part of the user's educational activities. For example, as illustrated in FIG. 8, the user completes job recall activities associated with job #1 during four of the learning units 810. During learning unit LU(a)N+2, the user completes job recall activities associated with three jobs.

Although FIG. 8 illustrates an example of recommending job recall activities to users during the learning unit to which the activity is mapped, job recall activities may alternatively be recommended to users at other times. For example, job recall activities mapped to the learning units in a given educational course can be aggregated and presented to a user after the user completes the course (e.g., at the end of the semester or quarter). As another example, a user applying for a particular job opening can view job recall activities mapped to historical learning units completed by the user that are associated with the job opening.

Recommending Job Recall Activities to Registered Users

In one embodiment, the education platform 450 is configured to integrate job recall activities into broader job search services provided to users of the platform 450. The education platform 450 leverages information about educational courses, learning units, job openings, and job recall activities to help users find, prepare for, and apply for desired jobs.

Figure 9:
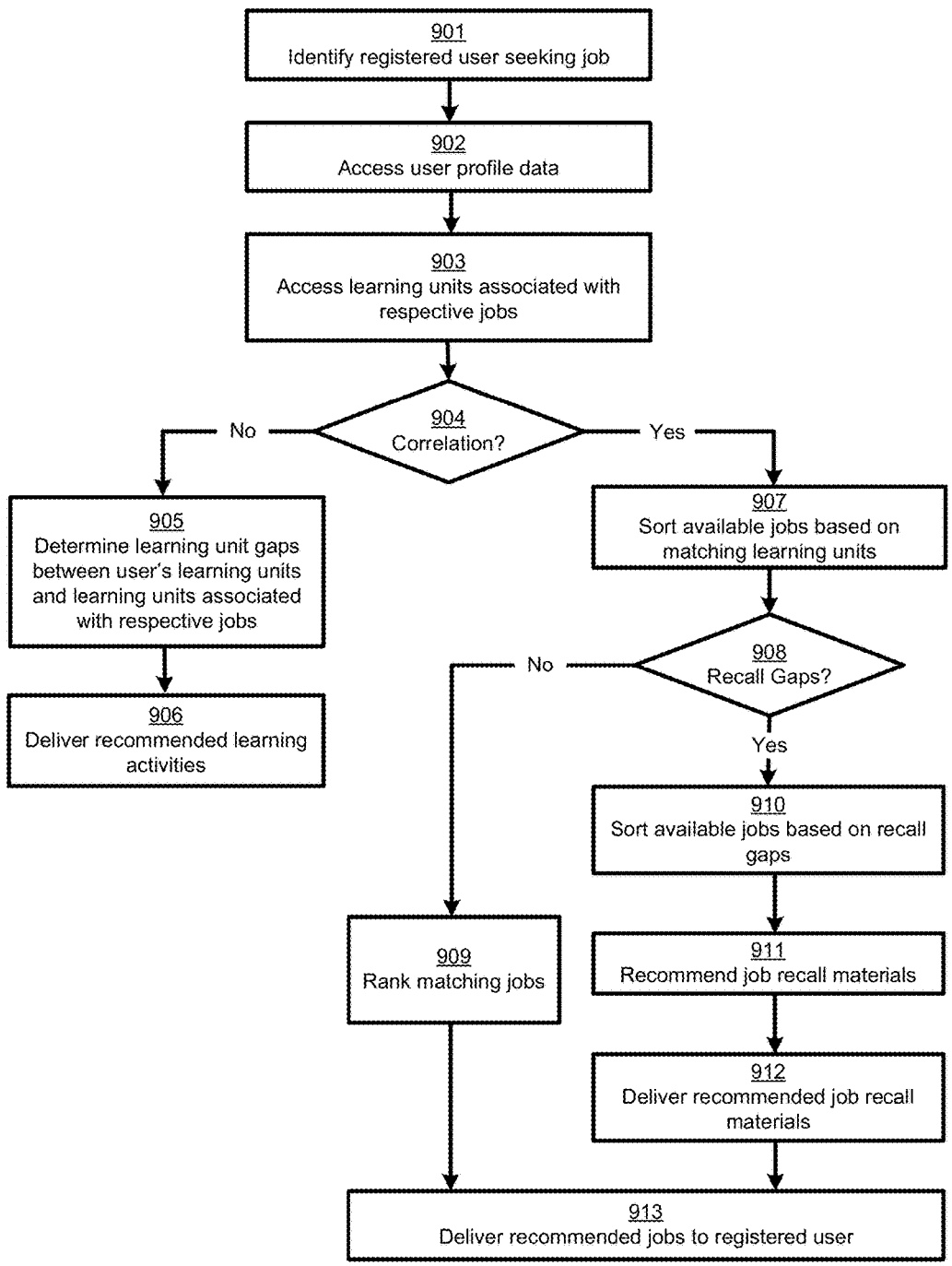
FIG. 9 illustrates an example method of recommending job recall materials, learning activities, or jobs to registered users, according to one embodiment.

FIG. 9 illustrates an example method of recommending learning activities, job recall activities, or jobs to registered users exploring the job market, according to one embodiment. In step 901, a registered user seeking a job is identified, for example by the user logging in or accessing a job search section of the education platform. In step 902, the registered user's profile data are accessed. The profile data may include personal data such as name, address, social connections, etc., as well as resume data, courses taken, learning units earned, grades assessments, and other data tracked by the education platform. The profile data is a rich set of data that includes the user's interactions with the education platform, potentially over the course of several education cycles.

In step 903, the learning units associated with respective jobs are accessed, for example from job postings, from resumes or learning units of those holding the job themselves, and/or from similar jobs.

In step 904, the education platform determines whether there is a correlation between a user's completed learning units and the learning units associated with respective job listings or classes of jobs. In some implementations, a threshold number or percentage of the learning units associated with a job need to correspond to the user's learning units in order to conclude that a correlation exists. If there is no correlation, then in step 905 the learning unit gaps between the user's learning units and the learning units associated with respective jobs is determined. The gaps represent additional concepts that a student should learn before applying for the job in order to meet the qualifications of the job. The gaps may vary in size from a single learning unit to dozens or more learning units that a user would need for the job. To address the gaps, the education platform delivers 906 content corresponding to recommended learning activities to the user. The recommended learning activities may be selected from the set of outstanding learning units based on the complexity of the learning units, the time involved to complete them, the difficulty, the expense, the location, or other factors. The recommended learning activities can assist the user in planning the user's further academic activities to tailor them to desired career opportunities.

If in step 904, the education platform determines that there is a correlation between a user's learning units and the learning units associated with respective jobs, then in step 907, available jobs are sorted based on the matching learning units. The education platform determines 908 whether there are recall gaps between job recall activities completed by the user and job recall materials associated with the available jobs. If the education platform determines 908 that there are not recall gaps, the matching jobs (that is, those for which the user has completed the associated recall activities) are ranked in step 909. In one embodiment, to rank 909 the matching jobs, the education platform computes a probability factor for each job based on the user's profile information. The probability factor is one mechanism for estimating the likelihood that the user will be a successful applicant for the job. For example, the probability factor may boost the estimated likelihood of success for applicants with high grade point averages, a strong match of learning units, extensive work history, etc., and lower the estimated likelihood of success for applicants who are applying to highly competitive employers or applicants who meet fewer than all the learning unit requirements of the job, for example. The probability factor may be informed, in part, by other users that have applied successfully, or not, to the same type of job in the near past. By comparing the other applicants' grades, learning units, and/or other factors, to the user's profile data, the system can estimate the likelihood that the user will be a successful applicant for the job. The recommended jobs are delivered in step 913 to the user, including, if available, the probability factor for estimating the likelihood that the user will be a successful applicant for the job if the user decides to pursue it.

If the education platform determines in step 908 that there are recall gaps between the job recall activities completed by the user and those associated with the available jobs, the education platform sorts 910 the available jobs based on the recall gaps and recommends 911 one or more job recall activities to the user. In one embodiment, the education platform recommends 911 the job recall activities by the process illustrated in FIG. 9. The recall materials associated with the recommended job recall activities are delivered 912 to the user. In one embodiment, the recommended jobs are also delivered 913 to the user in conjunction with the delivery 912 of the recommended job recall materials, or after the user has completed the job recall activities associated with the recommended jobs.

Additional Configuration Considerations

As an increasing number of job listings and job recall materials are added to the databases of the education platform 450 described herein, the traditional model of learning is transformed into a more flexible and customized learning model where education degrees are customized based on the aggregated job requirements and recall activities associated with jobs. For example, because job recall materials associated with various classes of jobs are mapped to individual learning units, an equivalent of a professional degree tailored to the specific requirements of a job can be built using the learning units.

Specifically, learning units associated with job recall activities needed for a particular class of jobs can be assembled into an educational program tailored to the class of jobs. In this model, the resulting professional education program can be promoted to registered users as either a new degree program or course, or as a supplement to an existing degree program/course. Alternatively, a user can select a customized set of learning units associated with job recall activities needed for one or more desired jobs. For example, a user seeking to apply for a particular job can create a customized course to learn or refresh the user's understanding of material needed for the desired job.

The present invention has been described in particular detail with respect to several possible embodiments. Those of skill in the art will appreciate that the invention may be practiced in other embodiments. The particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer and run by a computer processor. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

In addition, the present invention is not limited to any particular programming language. It is appreciated that a variety of programming languages may be used to implement the teachings of the present invention as described herein, and any references to specific languages, such as HTML or HTML5, are provided for enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter.

Accordingly, the disclosure of the present invention is intended to be illustrative, but not limiting, of the scope of the invention.

What is claimed is:

1. A method for correlating job recall materials to educational courses, the method comprising:
   extracting learning units, by an automated learning units extraction system of an online education platform, from content stored on a platform content catalog database of the online education platform, the extracting comprising:
      performing text extraction on the content to extract sequences of glyphs and embedded fonts;
      mapping the extracted sequences of glyphs and embedded fonts into character strings in a Unicode format, a position of each character identified by a horizontal and a vertical location;
      generating multilayered markup language documents from the character strings by aggregating content layers onto the character strings, the content layers comprising advertising content, social content, and user-generated content;
      identifying, from the multilayered markup language documents, content media types of the content comprising primary sources and secondary sources, the primary sources comprising one or more of a summary, a syllabus, and a textbook, the secondary sources comprising one or more of related content, user-generated content, Q&A, and testing materials, and
      sorting the content media types according to reliability of the content media types, wherein reliability of the primary sources is higher than reliability of secondary sources
   receiving at the online education platform, a job recall material uploaded to the online education platform;
   extracting properties from the job recall material, the properties comprising content attributes and delivery attributes of the job recall material;
   mapping, by the online education platform, the job recall material to at least one of the plurality of learning units based on the extracted properties of the job recall material; and
   responsive to a user of the online education platform completing the at least one of the plurality of learning units to which the job recall material is mapped, recommending the job recall material to the user.

2. The method of claim 1, wherein mapping the job recall material to at least one of the learning units comprises:
   extracting a concept from the job recall material; and
   mapping the job recall material to the at least one of the learning units by matching the extracted concept to a concept of the at least one of the learning units.

3. The method of claim 1, further comprising:
   serving the job recall material to the user; and
   storing a response to the job recall material received from the user as a job recall activity completed by the user.

4. The method of claim 3, wherein the online education platform stores a plurality of job listings each associated with one or more job recall materials, and wherein recommending the job recall material to the user comprises:
   identifying a recall gap between job recall activities completed by the user and job recall materials associated with each of the job listings, the recall gap comprising one or more uncompleted job recall activities; and recommending the uncompleted job recall activities to the user.

5. The method of claim 3, wherein the job recall material is associated with a job listing, the method further comprising:
responsive to a user completing the job recall activity, recommending the job listing to the user.

6. The method of claim 5, wherein the online education platform stores a plurality of job listings each associated with a plurality of learning units, and wherein recommending the job listing to the user comprises:
ranking the job listings in the online education platform based on a correlation between learning units completed by the user and the plurality of learning units associated with each job listing; and
recommending one or more of the job listings based on the ranking.

7. The method of claim 6, further comprising:
determining whether there is a correlation between the learning units completed by the user and learning units associated with job listings, the determining comprising:
determining whether a threshold number or percentage of the learning units associated with the job listings correspond to the learning units completed by the user;
responsive to determining that no correlation exists, determining a learning unit gap between the learning units completed by the user and the learning units associated with job listings; and
delivering recommended learning activities, based on the learning unit gap, to the user.

8. The method of claim 3, wherein the online education platform stores a plurality of job classes, each job class associated with one or more job recall materials and one or more job listings, and wherein recommending the job recall material to the user comprises:
identifying a recall gap between job recall activities completed by the user and job recall materials associated with one or more of the job classes, the recall gap comprising one or more uncompleted job recall activities; and
recommending the uncompleted job recall activities to the user.

9. The method of claim 1, wherein the extracting of the learning units further comprises:
slicing the content into logical groups by identifying the logical groups, based at least in part on structure of the content, wherein the structure is one or more of a subsection of a textbook, a chapter of a study guide, and a paragraph of a course summary; and
dicing the logical groups into key phrases, using language analysis, wherein each key phrase comprises a combination of an operator and an operand.

10. A non-transitory computer-readable storage medium storing executable computer program instructions for correlating job recall materials to educational courses, the computer program instructions comprising instructions for:
extracting learning units, by an automated learning units extraction system of an online education platform, from content stored on a platform content catalog database of the online education platform, the extracting comprising:
performing text extraction on the content to extract sequences of glyphs;
mapping the extracted sequences of glyphs and embedded fonts into character strings in a Unicode format;
generating multilayered markup language documents from the character strings by aggregating content layers onto the character strings;
identifying, from the multilayered markup language documents, content media types of the content comprising primary sources and secondary sources, the primary sources comprising one or more of a summary, a syllabus, and a textbook, the secondary sources comprising one or more of related content, user-generated content, Q&A, and testing materials, and
sorting the content media types according to reliability of the content media types, wherein reliability of the primary sources is higher than reliability of secondary sources;
receiving at the online education platform, a job recall material uploaded to the online education platform;
mapping, by the online education platform, the job recall material to at least one of the learning units; and
responsive to a user of the online education platform completing the at least one of the learning units to which the job recall material is mapped, recommending the job recall material to the user.

11. The non-transitory computer-readable storage medium of claim 10, wherein mapping the job recall material to at least one of the learning units comprises:
extracting a concept from the job recall material; and
mapping the job recall material to the at least one of the learning units by matching the extracted concept to a concept of the at least one of the learning units.

12. The non-transitory computer-readable storage medium of claim 10, the computer program instructions further comprising instructions for:
serving the job recall material to the user; and
storing a response to the job recall material received from the user as a job recall activity completed by the user.

13. The non-transitory computer-readable storage medium of claim 12, wherein the online education platform stores a plurality of job listings each associated with one or more job recall materials, and wherein recommending the job recall material to the user comprises:
identifying a recall gap between job recall activities completed by the user and job recall materials associated with each of the job listings, the recall gap comprising one or more uncompleted job recall activities; and
recommending the uncompleted job recall activities to the user.

14. The non-transitory computer-readable storage medium of claim 12, wherein the job recall material is associated with a job listing, the computer program instructions further comprising instructions for:
responsive to a user completing the job recall activity, recommending the job listing to the user.

15. The non-transitory computer-readable storage medium of claim 14, wherein the online education platform stores a plurality of job listings each associated with a plurality of learning units, and wherein recommending the job listing to the user comprises:
ranking the job listings in the online education platform based on a correlation between learning units completed by the user and the plurality of learning units associated with each job listing; and
recommending one or more of the job listings based on the ranking.

16. The non-transitory computer-readable storage medium of claim 12, wherein the online education platform stores a plurality of job classes, each job class associated with one or more job recall materials and one or more job listings, and wherein recommending the job recall material to the user comprises:

identifying a recall gap between job recall activities completed by the user and job recall materials associated with one or more of the job classes, the recall gap comprising one or more uncompleted job recall activities; and recommending the uncompleted job recall activities to the user.

17. A method for recommending job recall activities to a user of an online education platform, the method comprising:

extracting learning units, by an automated learning units extraction system of an online education platform, from content stored on a platform content catalog database of the online education platform, the extracting comprising:

performing text extraction on the content to extract sequences of glyphs and embedded fonts;

mapping the extracted sequences of glyphs and embedded fonts into character strings in a Unicode format;

generating multilayered markup language documents from the character strings by aggregating content layers onto the character strings;

identifying, from the multilayered markup language documents, content media types of the content comprising primary sources and secondary sources, the primary sources comprising one or more of a summary, a syllabus, and a textbook, the secondary sources comprising one or more of related content, user-generated content, Q&A, and testing materials, and sorting the content media types according to reliability of the content media types, wherein reliability of the primary sources is higher than reliability of secondary sources accessing user profile data of the user specifying learning units and job recall activities completed by the user, each job recall activity describing a user interaction with a job recall material;

identifying by the online education platform, a set of available job postings based on learning units associated with each available job posting and the learning units completed by the user;

determining by the online education platform, a recall gap between job recall activities associated with the available job postings and the job recall activities completed by the user, the recall gap comprising uncompleted job recall activities each mapped to at least one of the learning units in the learning units database; and recommending the uncompleted job recall activities to the user.

18. The method of claim 17, wherein recommending the uncompleted job recall activities to the user comprises:

identifying job recall activities in the recall gap mapped to one or more of the learning units completed by the user; and recommending the identified job recall activities to the user.

19. The method of claim 17, wherein recommending the uncompleted job recall activities to the user comprises:

identifying learning units not completed by the user mapped to the uncompleted job recall activities;

recommending to the user, the learning units not completed by the user; and recommending the uncompleted by recall activities to the user.

20. The method of claim 17, further comprising:

serving job recall materials corresponding to the uncompleted job recall activities to the user; and storing a response to the job recall material received from the user.

* * * * *